Figure 1:
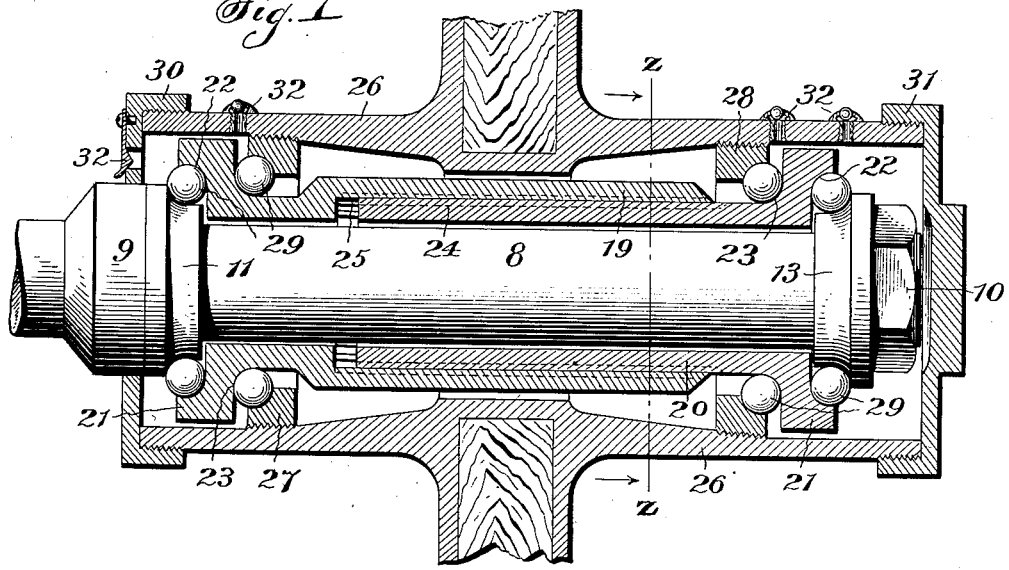

No. 862,679. PATENTED AUG. 6, 1907.
A. E. THAMES.
BEARING.
APPLICATION FILED NOV. 26, 1906.

2 SHEETS—SHEET 1.

Witnesses:
Jas. Es. Hutchinson
Grad. H. Lut

Inventor
Armistead E. Thames,
By Royal E. Burnham, Attorney

No. 862,679. PATENTED AUG. 6, 1907.
A. E. THAMES.
BEARING.
APPLICATION FILED NOV. 26, 1906.

2 SHEETS—SHEET 2.

Witnesses:
Jas E Hutchinson
Grant Leet

Inventor:
Armistead E. Thames,
By Royal Burnham, Attorney.

UNITED STATES PATENT OFFICE.

ARMISTEAD E. THAMES, OF MOBILE, ALABAMA.

BEARING.

No. 862,679.  Specification of Letters Patent.  Patented Aug. 6, 1907.

Application filed November 26, 1906. Serial No. 345,081.

*To all whom it may concern:*

Be it known that I, ARMISTEAD E. THAMES, a citizen of the United States, residing at Mobile, in the county of Mobile and State of Alabama, have invented certain new and useful Improvements in Bearings, of which the following is a specification, reference being had therein to the accompanying drawing.

This invention relates to journal-bearings, and provides multiple ball-bearings and interlocking auxiliary axle which are adapted for use in connection with motocars, live and dead axles, bicycles, shafting, and rolling-stock in general.

Simple and efficient means are provided whereby the sections of the auxiliary axle of a journal-bearing are caused to rotate together and relative rotative movement thereof prevented.

The construction is such that all sets of anti-friction balls can be easily and simultaneously adjusted.

By the employment of the auxiliary axle a larger number of balls are used than in ordinary bearings, friction is reduced, there is less wear on the individual balls, the crushing weight on the separate balls is reduced thereby permitting the use of smaller balls or less expensive balls, there is absence of wear on the main axle and hub, the parts liable to wear are easily removable individually or together, and multiple sets of balls being provided the speed of the balls and their tendency to become overheated are reduced.

When read in connection with the following description, the details of construction and arrangement of parts contemplated by this invention will be apparent from the accompanying drawings, forming part hereof, wherein a preferable embodiment of the invention is disclosed, for purposes of illustration.

In the drawings, like reference-characters refer to corresponding parts in the several views, whereof—

Figure 2:
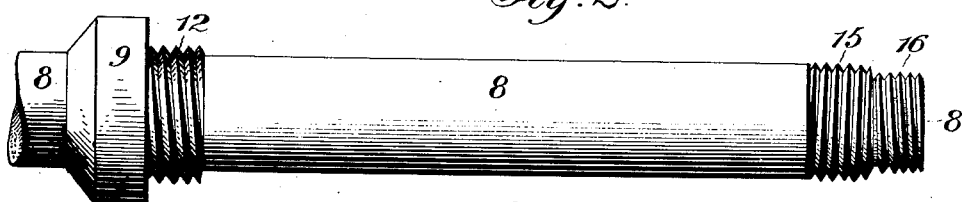
Figure 3:
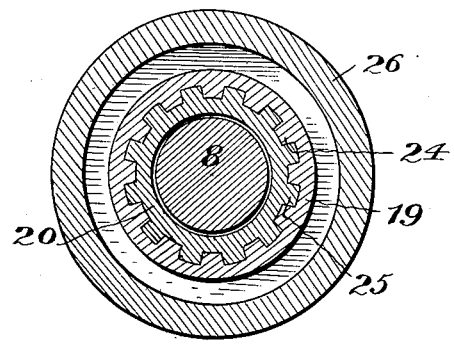
Figure 4:
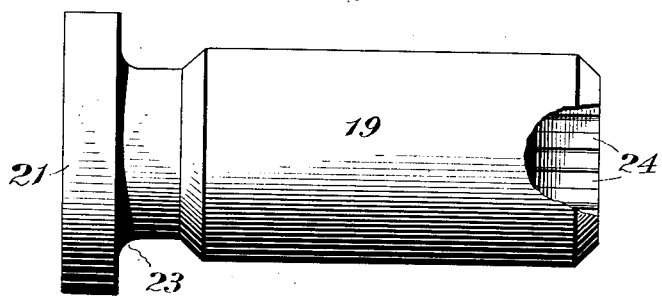
Figure 5:
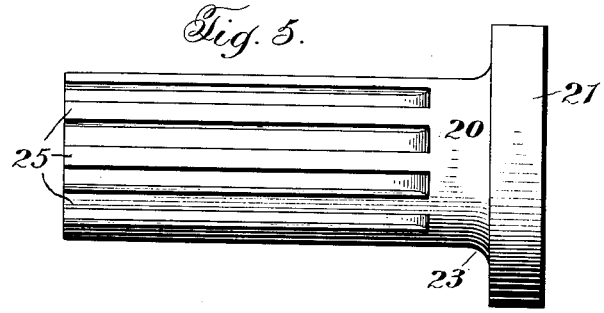
Figure 6:
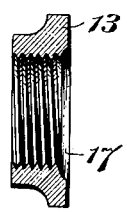
Figure 7:
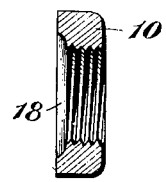

Figure 1 is a longitudinal sectional view through the hub of vehicle-wheel showing an adaptation of my invention; Fig. 2 is a view of the axle-spindle; Fig. 3 is a cross-sectional view, on the line z—z, Fig. 1; Fig. 4 is a view of the outer section of the auxiliary axle; Fig. 5 is a view of the inner section of the auxiliary axle; Fig. 6 is a sectional view of the outer bearing-ring; and Fig. 7 is a sectional view of the retaining-nut.

Having more particular reference to the drawings, 8 indicates an axle-spindle, 9 a fixed collar thereon, and 10 a retaining-nut on the outer end thereof.

An inner bearing-ring 11 is screwed on axle-spindle 8 and against collar 9, the disposition of the screw-threads 12 (right handed in this case, as shown in Fig. 2) being such that during the forward movement of the wheel rotative motion of ring 11 will be prevented by its engagement with collar 9, as the tendency to lateral movement in the ring is against the collar.

An outer bearing-ring 13 is screwed on the spindle near its end, and on the spindle outside of this ring is screwed a retaining-nut 10. The disposition of the screw-threads 15 for the bearing-ring (left-handed in this case, as shown in Fig. 2) and of the screw-threads 16 for the retaining-nut 10 (right handed in this case, as shown in Fig. 2) is such that during the forward movement of the wheel rotative motion of ring 13 and of nut 10 will be prevented by engagement of these parts with each other, as the tendency to lateral movement in said ring and nut is toward each other; and said ring and nut are locked in place by the converging disposition of the screw-threads, as is apparent. The diameter of the periphery of the screw-threads 16 for the retaining-nut is less than that of screw-threads 15 for the bearing-ring 13, in order that this bearing-ring may be easily placed in position and removed therefrom, when desired.

The outer end of the bore of ring 13 is turned out smooth and enlarged for part of its distance, as shown at 17, so that the said ring is capable of travel for that distance over the opposing screw-threads for the nut; and the inner end of the bore of nut 10 is similarly formed, as shown at 18, so that the nut is capable of travel for part of its length over the opposing screw-threads for the ring 13. By this construction of bearing-ring 13 and retaining-nut 10 the scope of adjustment is increased.

Between bearing-rings 11 and 13, and on the spindle, is disposed an auxiliary axle comprising outer section 19 and interlocking therewith an inner section 20 separable therefrom. Each section is formed with flanges 21, having thereon inner bearing-surfaces 22 complementary to bearing-rings 11 and 13, and also having thereon outer bearing-surfaces 23.

The bore of outer section 19 is fluted or formed with longitudinally-disposed ribs 24, and the inner section 20 is exteriorly formed with similar ribs 25 which are arranged to interlock with those of the outer section, whereby relative rotative movement of the two sections is prevented.

A hub 26 incases the spindle and the parts thereon. In the hub are screwed an inner bearing-ring 27 and an outer bearing-ring 28, these bearing-rings being complementary respectively to the outer bearing-surfaces 23 of sections 19 and 20. Between bearing-rings 27 and 28 and bearing-surfaces 23, and between bearing-rings 11 and 13 and bearing-surfaces 22, are disposed anti-friction balls 29. Dust-caps 30 and 31 are attached to the ends of the hub, and oil-ports 32 are provided for convenient lubrication of the bearings.

To adjust the bearing: When, for example, there is too great pressure between the several parts and the balls, the retaining-nut is loosened to release its clamp on bearing-ring 13, and this ring is turned to move it outwardly on the spindle. This lessens pressure on section 20 and permits the auxiliary axle to expand, whereby pressure between the other bearing-surfaces and balls is lessened in an obvious manner. Wear on the parts is taken up and the bearing tightened by reversal of this operation. The expansible axle permits the adjustment of the outer retaining-ring 13 to result in the adjustment of the other bearing-surfaces and balls, and keeps the comparative adjustment even at all times.

Having thus described my invention, what I claim as new, and desire to secure by Letters Patent, is:

1. In combination with a spindle, a fixed bearing-ring thereon, an adjustable bearing-ring thereon, an auxiliary axle comprising longitudinally-separable sections on said spindle and between said bearing-rings, there being a bearing-flange on each section, anti-friction elements between said bearing-rings and said flanges, a hub surrounding said spindle, and anti-friction elements interposed between said hub and axle.

2. In combination with a spindle, a fixed bearing-ring thereon, an adjustable bearing-ring thereon, an auxiliary axle comprising longitudinally-separable sections on said spindle and between said bearing-rings, there being a bearing-flange on each section, anti-friction elements between said bearing-rings and said flanges, a hub surrounding said spindle, bearing-rings on said hub, and anti-friction elements between said hub bearing-rings and said axle.

In testimony whereof I affix my signature in presence of two witnesses.

ARMISTEAD E. THAMES.

Witnesses:
SHELTON SIMS,
MARY McR. TODD.